US011152313B1

(12) United States Patent
Wong et al.

(10) Patent No.: US 11,152,313 B1
(45) Date of Patent: Oct. 19, 2021

(54) USING THREADING DISLOCATIONS IN GAN/SI SYSTEMS TO GENERATE PHYSICALLY UNCLONABLE FUNCTIONS

(71) Applicant: Synopsys, Inc., Mountain View, CA (US)

(72) Inventors: Hiu Yung Wong, Cupertino, CA (US); Rimvydas Mickevicius, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 98 days.

(21) Appl. No.: 16/526,834

(22) Filed: Jul. 30, 2019

Related U.S. Application Data

(60) Provisional application No. 62/712,259, filed on Jul. 31, 2018.

(51) Int. Cl.
  *H01L 23/00* (2006.01)
  *H01L 27/06* (2006.01)
  (Continued)

(52) U.S. Cl.
  CPC ........ *H01L 23/576* (2013.01); *H01L 21/8252* (2013.01); *H01L 27/0605* (2013.01);
  (Continued)

(58) Field of Classification Search
  CPC .............. H01L 23/576; H01L 21/8252; H01L 27/0605
  See application file for complete search history.

(56) References Cited

U.S. PATENT DOCUMENTS 5,737,259 A   4/1998  Chang
9,379,184 B1 * 6/2016  Cao .................. H01L 29/66409
(Continued)

FOREIGN PATENT DOCUMENTS

EP       3433791 A1    1/2019
WO    2018/175973 A1    9/2018

OTHER PUBLICATIONS

Shen et al., "Selective enhancement of randomness at the materials level: Poly-Si based physical unclonable functions (PUFs)," In 2016 IEEE Computer Society Annual Symposium on VLSI (ISVLSI), pp. 188-193. IEEE, 2016.

(Continued)

*Primary Examiner* — Errol V Fernandes
(74) *Attorney, Agent, or Firm* — Haynes Beffel & Wolfeld LLP; Andrew L. Dunlap

(57) ABSTRACT

The independent claims of this patent signify a concise description of embodiments. Roughly described, a physically unclonable function (PUF) device includes a crystalline substrate and a stack of crystalline layers on top. The stack is grown epitaxially such that lattice mismatch causes threading dislocations from the substrate to the top surface of the stack. Diodes are formed on the top surface by forming anode material on the top surface of the stack, thereby forming a diode junction with a cathode region below. A diode which includes a threading dislocation has a higher leakage current than one that does not. Circuitry connected to the diodes interrogates the array and outputs binary values indicating, for each of the diodes, whether the diode includes a threading dislocation. Such binary values can be used as the PUF of the chip. This Abstract is not intended to limit the scope of the claims.

14 Claims, 9 Drawing Sheets

(51) Int. Cl.
*H01L 29/20* (2006.01)
*H01L 29/205* (2006.01)
*H01L 29/778* (2006.01)
*H01L 29/861* (2006.01)
*H01L 29/32* (2006.01)
*H01L 29/66* (2006.01)
*H01L 21/8252* (2006.01)
*H01L 29/872* (2006.01)
*H04L 9/32* (2006.01)

(52) U.S. Cl.
CPC ........ *H01L 29/2003* (2013.01); *H01L 29/205* (2013.01); *H01L 29/32* (2013.01); *H01L 29/66136* (2013.01); *H01L 29/66143* (2013.01); *H01L 29/66462* (2013.01); *H01L 29/7786* (2013.01); *H01L 29/8613* (2013.01); *H01L 29/872* (2013.01); *H04L 9/3271* (2013.01)

(56) References Cited

U.S. PATENT DOCUMENTS

| | | | |
|---|---|---|---|
| 9,947,391 | B1 | 4/2018 | Mahatme et al. |
| 2011/0049568 | A1* | 3/2011 | Lochtefeld ............ H01L 27/092 257/190 |
| 2011/0215829 | A1 | 9/2011 | Guajardo Merchan et al. |
| 2017/0177853 | A1 | 6/2017 | Ewing |
| 2018/0019925 | A1* | 1/2018 | Watanabe ............. H04L 9/0866 |

OTHER PUBLICATIONS

Speck, "The role of threading dislocations in the physical properties of GaN and its alloys," Materials Science Forum, vols. 353-356, pp. 769-778 (2001).

Speck, et al., "The role of threading dislocations in the physical properties of GaN and its alloys," Physica B: Physics of Condensed Matter, 273-274 (1999): 24-32.

Moyer, "A New PUF Mechanism," Electronic Engineering Journal, Jul. 17, 2017, 10 pages.

* cited by examiner

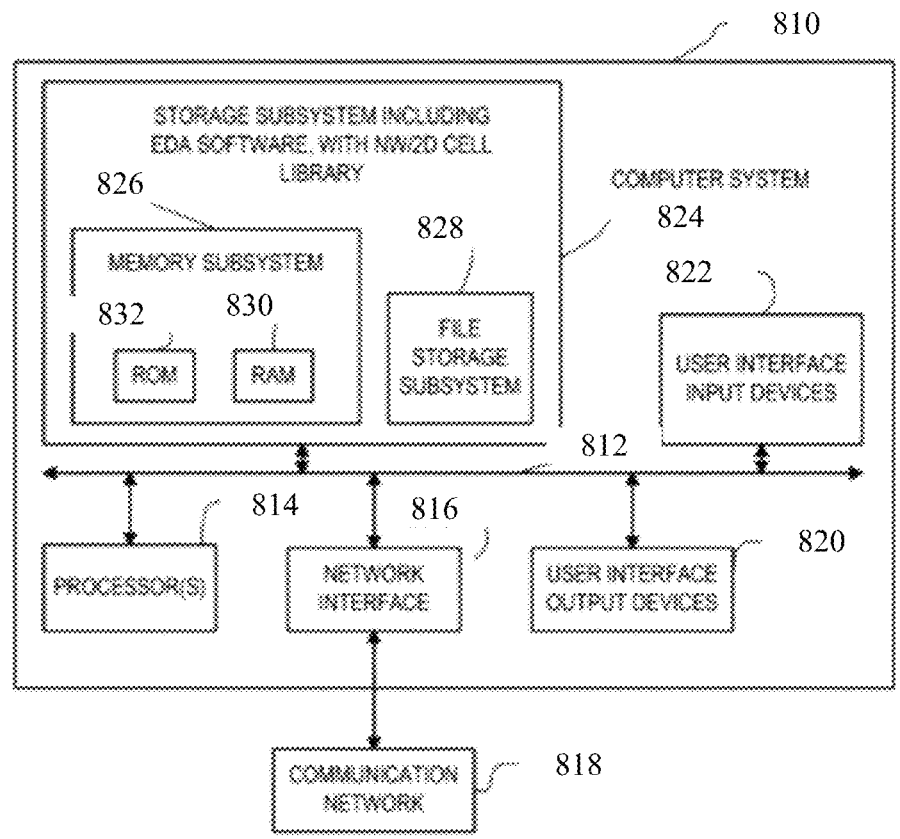
FIG. 8A
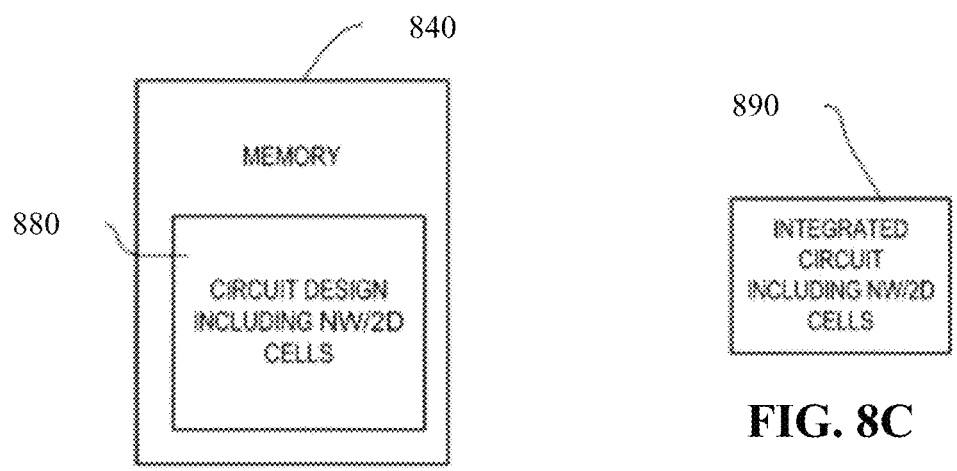
FIG. 8B
FIG. 8C

USING THREADING DISLOCATIONS IN GAN/SI SYSTEMS TO GENERATE PHYSICALLY UNCLONABLE FUNCTIONS

CROSS-REFERENCE TO OTHER APPLICATIONS

This application claims priority under 35 U.S.C. § 119(e) to U.S. Provisional Application No. 62/712,259, filed on 31 Jul. 2018, the entire contents of which are hereby incorporated by reference herein.

FIELD OF THE INVENTION

This invention relates to physically unclonable functions, and more specifically to a robust structure for generating them in certain kinds of integrated circuits.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

DISCLAIMER

In the following Background, Summary, and Detailed Description, headings should not be construed as necessarily limiting. In the following Background, Summary and Detailed Description, the citation or identification of any publication does not signify relevance or status as prior art for any of the claimed or described embodiments.

BACKGROUND

Internet of Things (IoTs) devices require unique IDs for security reasons. Due to the low power constraint in IoT circuits, traditional encryption schemes such as RSA generally cannot be used. Yet cybersecurity of IoT devices is extremely important, for example to avoid hacking of heavy machinery. Since the IoTs will be created by different processes and manufacturers, and their number of is likely to be in the trillions, it will be expensive and difficult to assign a unique ID to each IoT. Therefore, in order to create unique IDs, researchers have been trying the use of random processes, like the fingerprints of human beings. But currently, those schemes that rely on random process are not stable under long term operation, which means the ID may change if not designed properly.

Many IoT devices will be implemented in GaN, especially those intended for use in harsh environments such as automobiles, heavy machinery and oil drilling. With bandgap of 3.4 eV, GaN has very low leakage current at high voltage and high temperature. GaN devices (HEMTs or diodes, for example) can operate at elevated temperatures. The bandgap of GaN is much wider than that of Silicon (3.4 eV vs 1.12 eV), which also means it is more radiation-hard. Circuits formed by GaN will be more immune to radiation triggered circuit failure.

A common way to create an ID is by the generation of physical unclonable function (PUF). PUFs are generally grouped into two types. One is "strong PUF" which can handle many Challenge-Response-Pairs (CRPs). Another is "weak PUF" which only has very few (even just one) CRPs but it can be used as the private key for encryption.

A common way to generate a PUF is use variations in circuit performance arising from slight variations in the fabrication process in an integrated circuit chip. The chip can, for example, compare the frequencies of two different ring-oscillators fabricated on the chip. The idea is that since the fabrication process produces small variations across a chip, of the two ring oscillators are located in different places then they will operate at slightly different frequencies. However, such circuits are subject to degradation over time, and thus the PUF, and hence the ID, will change after long use.

It is therefore desirable to provide a more reliable structure for generating PUFs on GaN and similar other types of integrated circuits.

SUMMARY

The claims signify a brief description of one or more of the innovations, embodiments, and/or examples found within this disclosure.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

Roughly described, embodiments disclosed herein provide a new method to generate PUFs which is stable and suitable for GaN IoTs, as well as other devices formed on III-V monocrystalline semiconductors. Embodiments use existing defects in GaN-on-Si systems (or other lattice mismatch systems) to create a random ID. Existing defects (such as Threading Dislocations) by their very nature are random and affect the electrical conductivity of devices (such as diodes). In one embodiment, a diode array is constructed. If there is a threading dislocation in the diode, it will be more conductive when reverse biased than if it has no threading dislocation defect. More conductive diodes can be encoded as one value for a logic bit, and the less conductive diodes can be encoded as the opposite value for a logic bit. As a result, one can obtain random IDs through the diode array based on the randomness of conductivity. Defects are usually robust, in that they will not change under most circuit operations. Therefore, the defects are more reliable in the long run compared to other PUF technologies.

One or more embodiments of the invention or elements thereof can be implemented in the form of a computer product including a non-transitory computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the invention will become apparent from the following detailed description of illustrative embodiments thereof, which is to be read in connection with the accompanying drawings.

BRIEF DESCRIPTION OF THE DRAWINGS

The invention will be described with respect to specific embodiments thereof, and reference will be made to the drawings.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIGS. 8A, 8B and 8C depict simplified block diagrams of a computer system suitable for use with embodiments of the technology, as well as circuit design and circuit embodiments of the technology.

Figure 1:
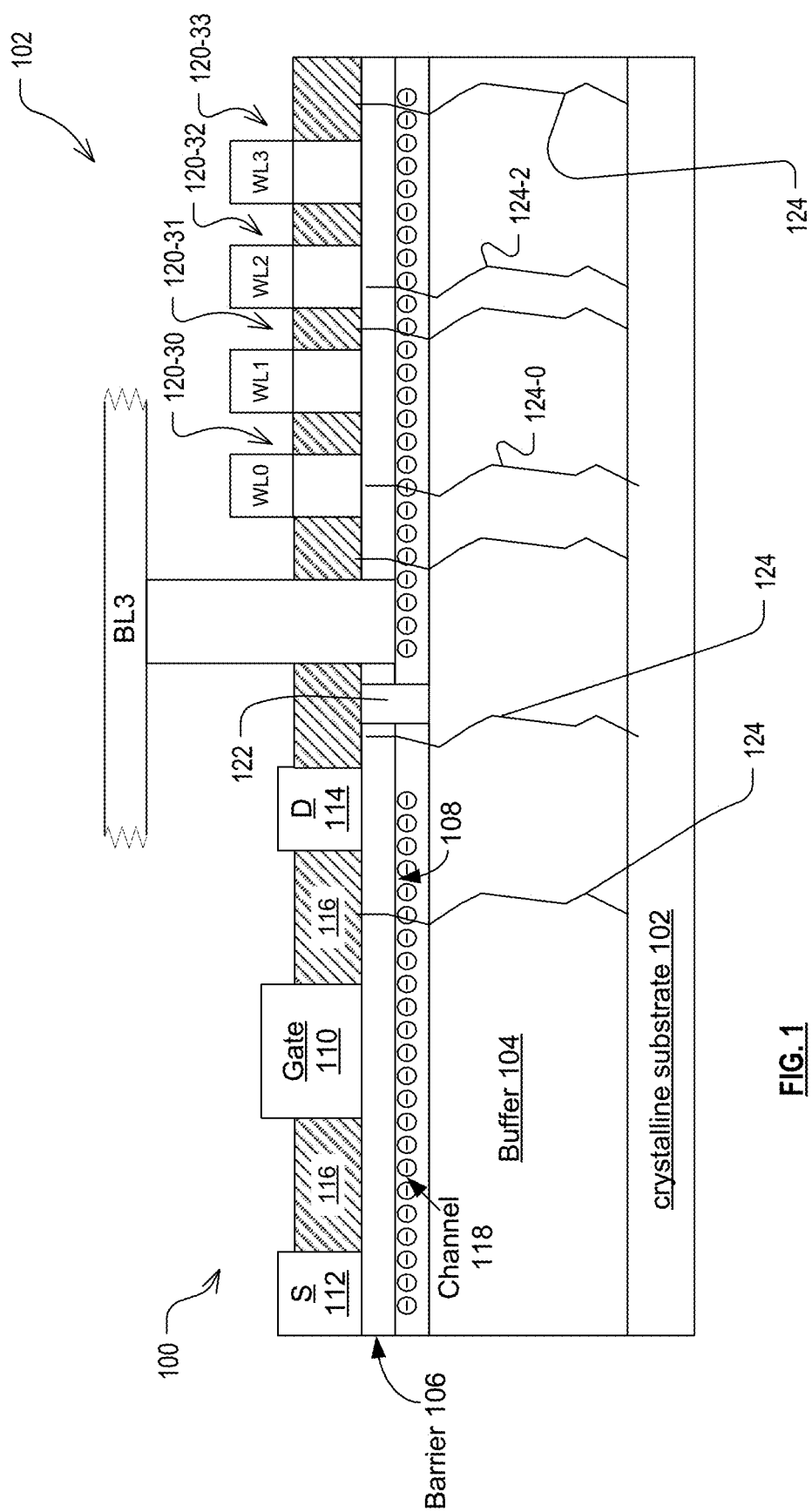
FIG. 1 is a symbolic diagram of a cross-section of a device incorporating features of the invention.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The following Detailed Description, Figures and Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Embodiments disclosed herein provide a method for generating PUF functions which is stable and suitable for GaN IoTs. Embodiments use existing defects in GaN-on-Si systems (or other lattice mismatch systems) to create a unique ID. Existing defects (such as Threading Dislocation) by their very nature are random and affect the electrical conductivity of certain devices, such as reverse biased diodes. In one embodiment, a diode array is constructed. If there is a threading dislocation in the diode, it will be more conductive in reverse-biased and encoded as one binary logic value (logic 1 or 0, depending on the convention used). If there is no defect, the diode is less conductive in reverse-biased and is encoded as the opposite binary value (0 or 1). As a result, one can obtain random IDs through the diode array based on the randomness of conductivity. Defects are usually robust, meaning they will not change under most circuit operations. Therefore, the defects are more reliable in the long run compared to other PUF technologies.

Embodiments disclosed herein use threading dislocations (or other defects) in GaN-on-Si system (or other lattice mismatch system) as weak PUF (as private key) for GaN IoT. They can also use such defects as strong PUF when coupled with adequate challenge/response circuitry.

GaN IoT is expected to be important for harsh environments such as automobiles, heavy machinery and oil drilling, for example. With a bandgap of 3.4 eV, GaN has a very low leakage current at high voltage and high temperature. GaN devices (HEMT or diode) can operate at elevated temperatures. The bandgap is much wider than Silicon (3.4 eV vs 1.12 eV) which also means it is more radiation-hard. Circuits formed by GaN will be more immune to radiation triggered circuit failure.

When GaN is grown epitaxially on Si, due to lattice mismatch, defects will form and will continue to thread to the surface. These defects are known as Threading Dislocations (TDs). For a TEM micrograph of a representative microstructure of a 5 μm thick MOCVD grown GaN film on a sapphire substrate, showing a number of threading dislocations, see FIG. 1 of J. Speck, The Role of Threading Dislocations in the Physical Properties of GaN and its Alloys, Physica B 273-274 at 24-32 (1999). The Speck reference is incorporated by reference herein.

Some TD's are conductive (e.g. screw dislocations), and thereby allow greater leakage current to flow across a reverse-biased diode junction. These TDs leave any HEMTs formed in the GaN crystalline layers largely unaffected, because HEMTs have no PN junction. For GaN HEMTs, the effect of threading dislocation on the current is mostly through Coulomb scattering, but due to the high density of 2DEG, Coulomb scattering is highly screened and has minimal impact to the transistor ON current.

Embodiments disclosed herein use threading dislocation in GaN/Si-substrate to realize "weak PUF" for GaN IoT devices. Large numbers of threading dislocation can be realized on GaN/Si-substrates (e.g. on the order of $10^9$ $cm^{-2}$) without impacting the regular surface channel devices. Thus an embodiment includes an array of diodes formed at the top surface of the stack of crystalline layers above the substrate. When there is a least one threading dislocation through a diode, that diode will have relatively high leakage current. When there is no threading dislocation through a particular diode, leakage current through that diode will be minimal. The two distinct leakage current levels are detected and encoded as two different binary logic values. The series of encoded binary values can be used as the PUF of that chip. Since the threading dislocations are random, each device will get a unique ID.

In addition, once the series of encoded binary values (the key) is determined, any cryptographic process may follow. For example, the weak PUF output may be used as the key in a keyed-hash message authentication code (HMAC) challenge-response sequence. Still further, the output may be used as a secret key to encrypt/decrypt data on the device. In general there may be a challenge/response circuit built onto the chip which can be used to expand the functionality of the PUF to provide strong PUF.

It is not an imperative that PUFs be literally "unique". It is sufficient that they be random and contain enough data bits so as to render it very difficult to compute an unknown response given the other challenge/response pairs (CRPs) or some of the properties of the random components from a PUF, and sufficiently unique such that it is unlikely that two PUFs with the same responses will be manufactured.

FIG. 1 is a symbolic diagram of a cross-section of a device incorporating features of the invention. On a single chip, it includes transistor circuitry, represented symbolically by an HFET transistor 100, and a diode array 102. The transistor 100 is a conventional HFET device in the embodiment of FIG. 1, but it could be any type of HFET, such as metal-insulator-semiconductor-HFETs (MISHFETs), double-channel HFETs/HEMTs/MISHFETs, dual-Channel HFETs/HEMTs/MISHFETs, or even thin-body (SOI, FinFET, tri-gate, gate-all-around) transistors, or combinations thereof.

Substrate 102 is a crystalline semiconductor substrate, for example, a silicon, silicon carbide, Ge, Diamond, Boron-Nitride, gallium nitride or sapphire wafer. Buffer 104 is also a crystalline material, for example a crystalline III-V semiconductor material. For example it may be a group III-nitride material such as GaN. Buffer 104 supports a channel 118 under suitable bias voltages. Barrier 106 is a different III-V semiconductor material having a wider band gap than the material of buffer 104, and may be, for example, $Al_xGa_{1-x}N$ where x may vary from, for example, about 0.1 to about 1. Barrier 106 and buffer 104 thus meet at heterojunction 108. Buffer 104 and barrier 106 are both piezoelectric layers, formed of materials having piezoelectric properties. Gate 110 is typically formed of a metal, for example a NiAu bilayer or alloy, that will form a Schottky barrier with barrier 106. In some devices, a thin gate dielectric (not shown) may intervene between gate 110 and barrier 106. Source 112 and drain 114 are electrically coupled to barrier 106, and are formed of a conductive material which forms an ohmic contact with barrier 106, for example TiN, metal layers such as Ti/Al/Ni/Au, or some other suitable material or combination of materials. In other examples, barrier 106 may be removed at the locations of source 112 and drain 114, and source 112 and drain 114 may be electrically coupled to buffer 104. Passivation layer 116 is conventionally silicon nitride, but may be some other dielectric material. Buffer 104 and barrier 106 are grown epitaxially on substrate 102, though in some embodiments they can be grown from a seed layer (not shown) deposited on substrate 102. In order to maximize electron mobility in channel region 118, buffer 104 is not intentionally doped, thus avoiding collisions with ionized dopant atoms, i.e. impurity scattering. In another embodiment, buffer layer 104 has two sub-layers. The upper sublayer is not intentionally doped, but the lower sublayer is intentionally doped which has the effect of helping to reduce leakage. Note that as used herein, a crystalline material of a specified composition does not become a different crystalline material due to the presence of any dopant atoms. For example, undoped GaN and doped GaN are both considered herein to be the same crystalline material.

At heterojunction 108, polarization charge at the interface of barrier 106 and buffer 104 creates a highly conductive layer of high-mobility electrons known as a two-dimensional electron gas (2DEG) at channel region 118.

Whereas in the embodiment of FIG. 1 the material of barrier 106 has a wider band gap than that of the material of buffer 104, in another embodiment barrier 106 can have a narrower band gap than that of the material of buffer 104. In such an embodiment the polarization charge at the interface of barrier 106 and buffer 104 creates a highly conductive layer of holes instead of electrons, and they are known as a two-dimensional hole gas (2DHG) at channel region 118.

All the crystalline layers above the substrate 102, up to and including the barrier layer 106, are together sometimes referred to herein as a "stack" of crystalline layers.

Buffer layer 104 is a monocrystalline material, but it has a lattice constant which differs from that of crystalline substrate 102. When buffer layer 104 is grown epitaxially on the substrate 102, therefore, the mismatch causes defects to form, some of which thread all the way from the top surface of the substrate to the top surface of the uppermost crystalline layer of the stack. These defects are spaced very far apart on a microscopic scale, so they do not affect the nature of the buffer and barrier layers 104 and 106 as "monocrystalline".

Figure 2:
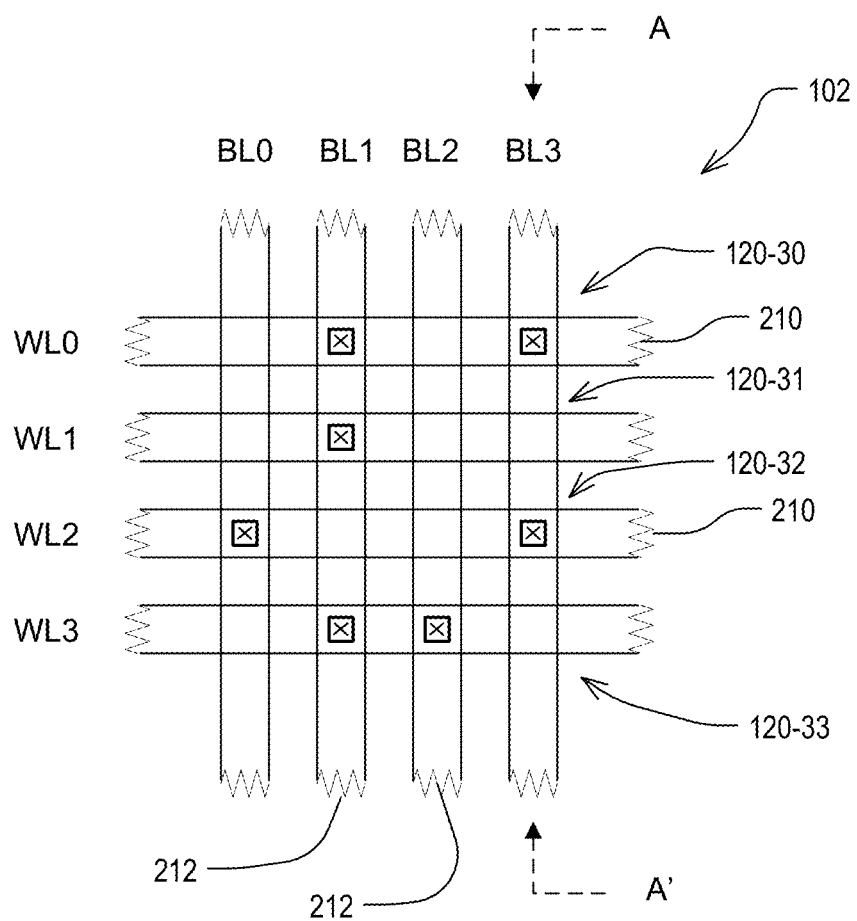
FIG. 2 is a plan view of a 16-diode square portion of a diode array incorporating features of the invention.

Though not required in all embodiments, diode array 102 in the embodiment of FIG. 1 is a cross-bar array. FIG. 2 is a plan view of a 16-diode square portion of the array, showing only a set of four word line conductors 210 (identified individually as WL0, WL1, WL2 and WL3)

crossing a set of four bit line conductors 212 (identified individually as BL0, BL1, BL2 and BL3). Because the functions of these conductors can be interchangeable in various embodiments, they are sometimes referred to simply as "first" conductors and "second" conductors. A diode is formed at each cross-point, as described below. Individual ones of these diodes may or may not be affected by the threading dislocations, also as described below.

The view of FIG. 1 is a cross-section taken along one of the bit lines BL3 in FIG. 2, as indicated by sight lines A-A'. Thus four of the diodes are shown, specifically diodes 120-30, 120-31, 120-32 and 120-33. For convenience, the diodes are numbered herein in the form 120-bw, where b is the bit line number and w is the word line number in the diagram of FIG. 2. In FIG. 1, the diodes are formed by growing, depositing or otherwise forming anode material on the top surface of barrier layer 106. In one embodiment, the anode material is a P-type semiconductor such as Mg-doped GaN or AlGaN. Since the barrier material 106 is an N-type material, a PN junction is formed at the interface where the anode material meets the barrier material 106.

In another embodiment, the anode material is a metal such as molybdenum, platinum, chromium or tungsten, and certain silicides such as palladium silicide and platinum silicide. In this case a Schottky junction is formed at the interface where the anode material meets the barrier material 106.

In an embodiment in which the material of barrier 106 has a narrower band gap than that of the material of buffer 104, the barrier material 104 has P-type polarity. In this case the diode material formed on the top surface of barrier layer 106 can be a metal (in order to create a Schottky junction) or it can be an N-type semiconductor such as Si-doped GaN (in order to create a PN junction). Thus in this case the barrier layer 106 contains the anode region and the additional diode material grown on top is the cathode. As used herein, anodes and cathodes are collectively referred to herein as "poles" of the diode, and their materials are "pole materials". The pole material formed on the top surface of the barrier layer 106, whether it be a metal or an N-type semiconductor or a P-type semiconductor, is sometimes referred to collectively herein as a "upper" pole material. For PN diodes the upper pole material is diode pole material of a first polarity (N or P), while the diode pole region in the barrier layer below has a second polarity which is opposite the first polarity.

In one embodiment all of the diodes are either PN diodes or Schottky diodes but not both. In another embodiment some of the diodes are PN diodes and others are Schottky diodes.

Figure 4:
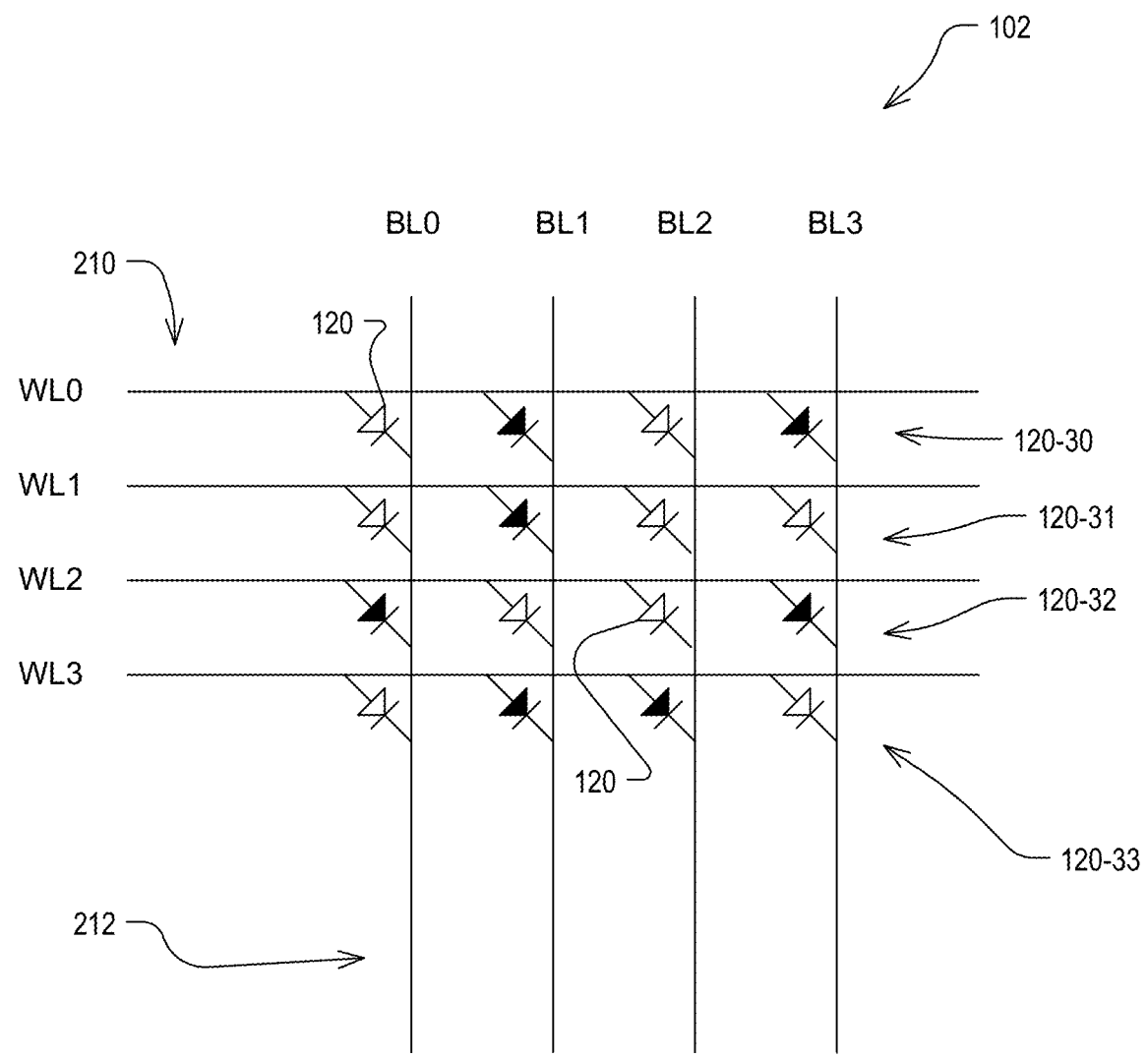
FIG. 4 is a circuit view of the diode array portion of FIG. 2, in which diodes having a threading dislocation are shown with filled bodies whereas diodes having no TDs are shown with open bodies.

Referring again to the embodiment of FIGS. 1 and 4, all of the diodes which share a word line have their anodes connected to that word line. The four word lines, WL0, WL1, WL2 and WL3 of FIG. 2, are shown formed on top of the anodes of the diodes in FIG. 1. In FIG. 1 the word lines extend perpendicularly to the page. Similarly, all of the diodes which share a bit line have their cathodes connected to that bit line. In FIG. 1 only one bit line is visible, BL3. BL3 is connected through a contact plug to the channel 118, which is in turn connected to the cathodes of all of the diodes 120-30, 120-31, 120-32 and 120-33. The cathodes are regions in the barrier layer 106 and the 2DEG 118 which are directly below the respective anodes. The channel 118 under the diode array 102 is isolated from the channel 118 under transistor circuitry 100 by a structure shown symbolically as 122. The isolation structure 122 can use any of several known techniques for disrupting the 2DEG layer. The channel 118 under each row of diodes sharing a bit line in the array, too, is isolated from the channel 118 under adjacent rows of diodes sharing adjacent bit lines in the array, by similar structures (not shown).

As mentioned, when GaN is grown epitaxially on a substrate such as Si, due to lattice mismatch, defects will form and continue to thread to the surface which is called Threading Dislocation (TD). Some TD's are conductive (e.g. screw dislocations). Several TDs 124 are illustrated in FIG. 1 symbolically. It can be seen that two of them extend up into the circuitry area, two of them (124-0 and 124-2) extend up through the cathodes of diodes 120-30 and 120-32, respectively, and several others extend up to locations on the surface of the crystalline stack which are inactive.

For GaN HEMTs, since there is no PN junction, the effect of threading dislocation on the current is mostly through Coulomb scattering. But due to the high density of 2DEG, Coulomb scattering is highly screened and the TDs have minimal impact to the transistor ON current. Thus large numbers of threading dislocation can be realized on GaN/Si-substrates (on the order of $10^9$ cm$^{-2}$) without impacting the regular surface channel devices. When there is threading dislocation through a diode, on the other hand, that diode will have relatively high reverse-bias leakage current. When there is no threading dislocation through the diode, the reverse-bias leakage current through that diode will be minimal. The diode array therefore can be read, and one binary logic value assigned to each diode with higher leakage current and the opposite logic value assigned to each diode with the lower leakage current. The series of logic 1s and logic 0s can be used as the PUF of that chip. Since the threading dislocations are random, each device will get a unique ID.

Figure 3:
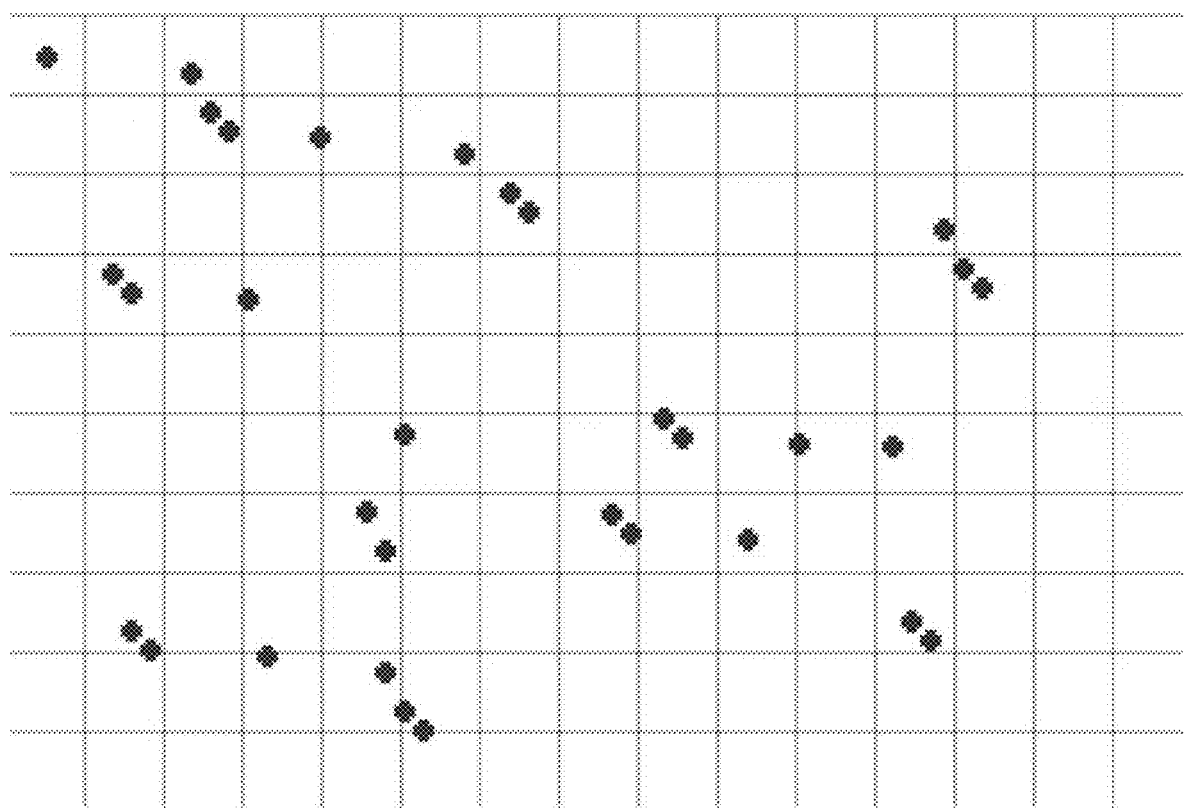
FIG. 3 is a plan view which diagrammatically illustrates the presence or absence of threading dislocations relative to the chip area occupied by the diodes of an array.

FIG. 3 is a plan view which diagrammatically illustrates the presence or absence of TDs relative to the chip area occupied by the diodes of an array. In FIG. 3, each square represents the area of a different diode. Each cross represents TD. The TDs extend generally perpendicularly into the page. When there is one or more TD within the area of a diode, that diode will have a higher leakage current and can be encoded for example as a logic 0. For those without any TDs, those diodes can be encoded with the opposite logic value due to low leakage. Also, growing the diode array on the same substrate with high TD density, the GaN HEMT performance may not be heavily impacted but the at the same time a PUF can be integrated without extra cost.

In FIG. 2, as mentioned, each cross-point in the array portion shown includes a diode. Those diodes that include TDs are indicated with an x-box at the cross-point. It can be seen that, in accordance with FIG. 1, diodes 120-30 and 120-32 have TDs whereas diodes 120-31 and 120-33 do not. FIG. 4 is a circuit view of the diode array portion of FIG. 2, in which diodes having a TD are shown with filled bodies whereas diodes having no TDs are shown with open bodies. (Note the diodes in FIG. 4 would be oriented in the opposite direction in an embodiment in which the diode material grown on the top surface of barrier layer 106 is an N-type semiconductor.)

The array can be interrogated and the outputs decoded by interrogation/decoding circuitry which can be formed on the periphery of the array or elsewhere on the chip, or on a separate chip. The interrogation/decoding circuitry gives a random string of 1's and 0's based on the presence or absence of a TD in each diode, and this string (or part of it) serves as a unique ID for that IoT device. Many types of interrogation/decoding circuits are known in the art for diode arrays, and the reader will be aware of how to adapt them to diode arrays such as those described herein.

Figure 5:
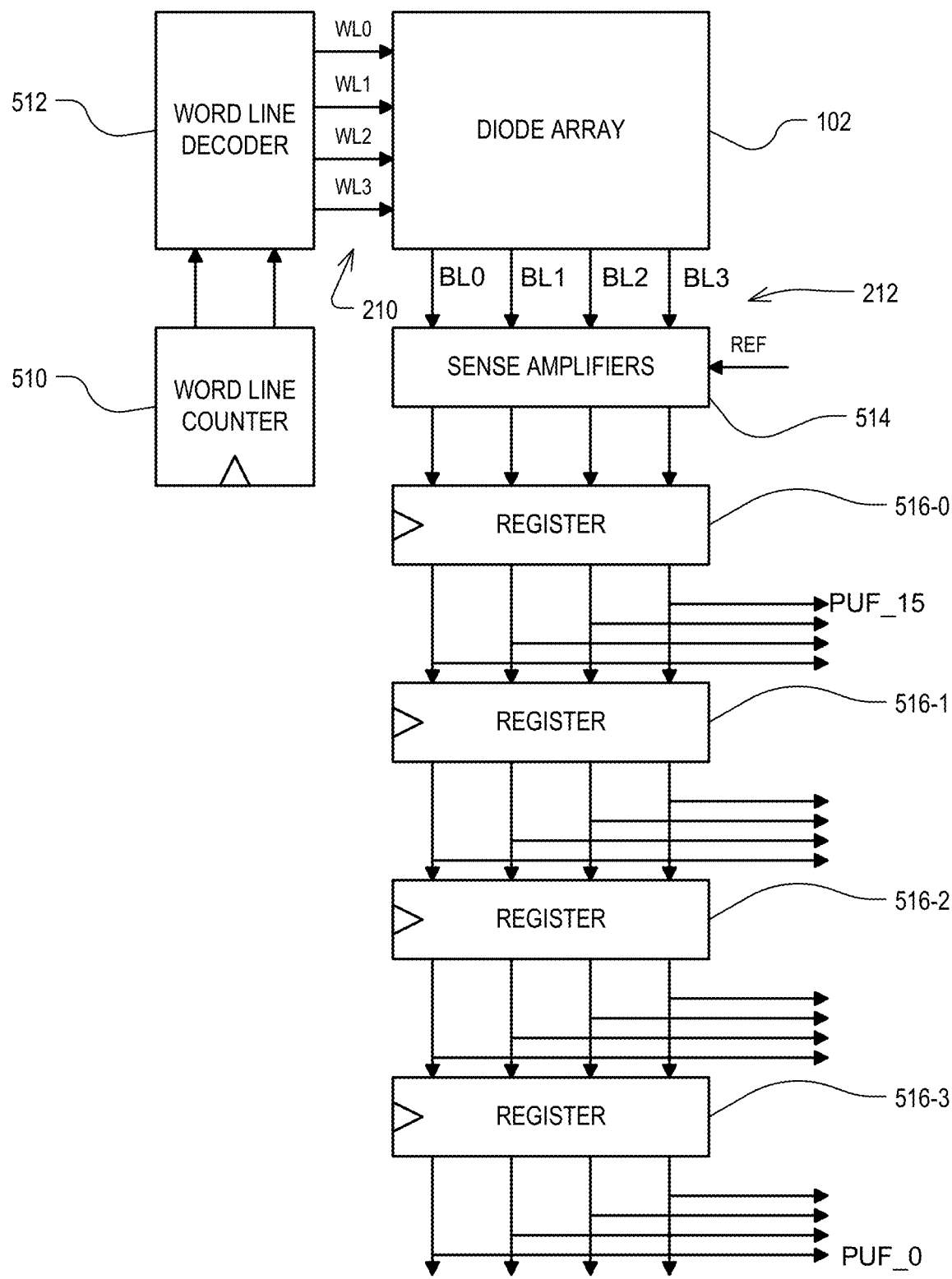
FIG. 5 is a logic diagram showing an example type of interrogation/decoding logic.

FIG. 5 is a logic diagram of one of many types of such interrogation/decoding logic. It includes a word line counter 510 which counts sequentially through four states, encoded on two conductors provided to a word line decoder 512. Word line decoder 512 decodes the input count so as to select one corresponding word line 210 for interrogating. For example, word line decoder 512 may apply a low voltage on the selected word line while applying a higher voltage on the unselected word lines, and while the bit lines are biased to the higher voltage. The diode array 102 thus produces a signal output (current mode or voltage mode) on the bit lines 212. The signal has one magnitude if the diode at the intersection of the bit line and the selected word line has high leakage (meaning the diode contains a TD), and a different magnitude if that diode has a low leakage (meaning the diode does not contain a TD). The output signals provided to sense amplifiers 514, which compare the signal magnitudes to a reference in order to encode them as a logic 0 or a logic 1. The reference in various embodiments can be a fixed or variable voltage or current level, and can be constant for all sense amplifiers or different for different sense amplifiers, all in dependence upon the interrogation scheme used in that embodiment. In other embodiments the sense amplifiers 514 can be omitted, for example if the magnitude outputs of the diode array 102 are already sufficiently distinguishable by downstream digital circuitry. The output logic values from the sense amplifiers 514 (or directly from the bit lines 212) are provided to a sequence of registers 516-0, 516-1, 516-2 and 516-3 (illustratively 516), where they are clocked into memory. At each increment in the word line count the word line decoder 512 selects a different one of the word lines 210, and the logic values represented by the signal outputs on the bit lines 212 are clocked into the register 516-0 while the values from the prior word line of diodes are transferred to the next register 516-1, and so on until all 16 diodes have been read and stored into the registers 516. The 16 output values of the registers 516 then make up the 16 bits of a PUF.

Figure 6:
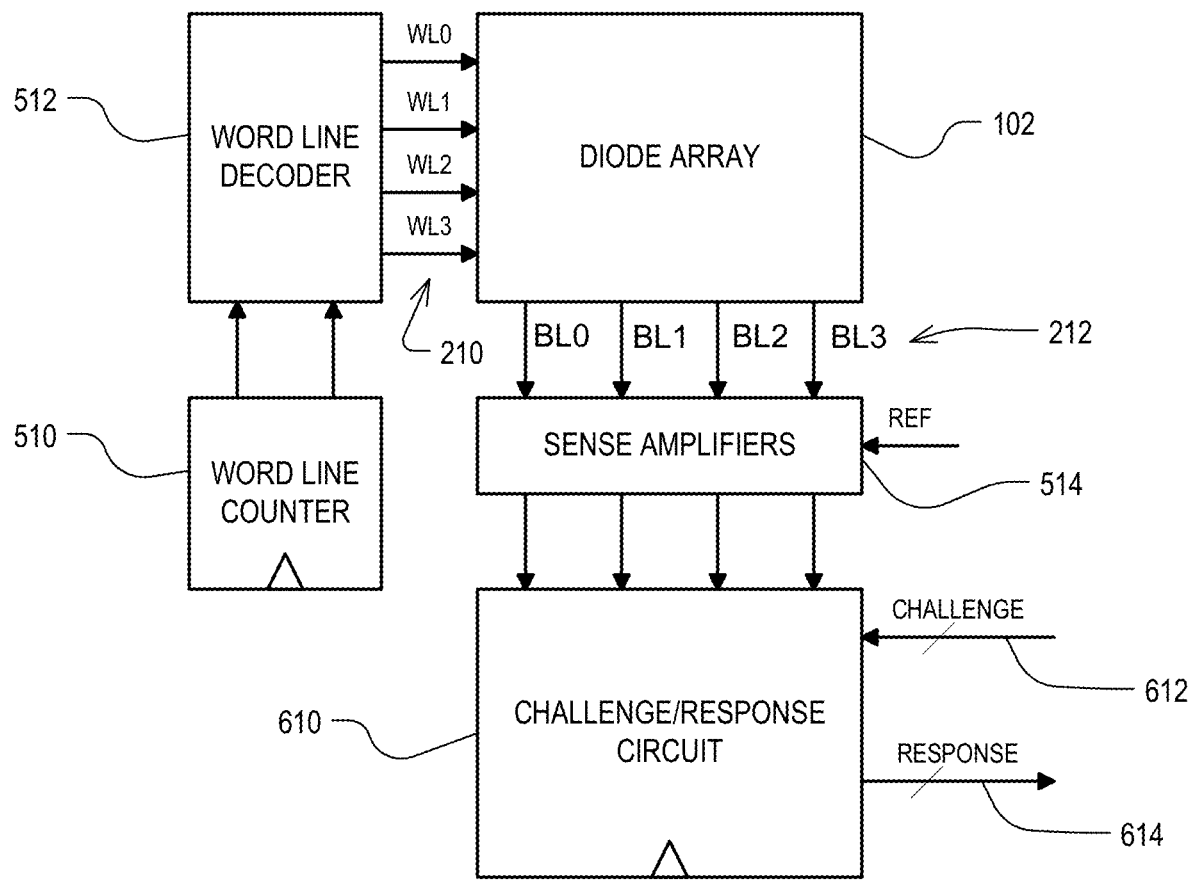
FIG. 6 illustrates the use of a random number generated by the diode array in a challenge/response arrangement.

FIG. 6 illustrates the use of the random number generated by the diode array in a challenge/response arrangement. In FIG. 6, most components are the same as in FIG. 5, but the four registers 516 are replaced by a challenge/response circuit 610. The challenge/response circuit 610 receives the inputs from the sense amplifiers 514, and also receives provided challenge values on bus 612. The challenge/response circuit 610 outputs a response value on bus 614 which depends on both the provided challenge value and the logic outputs of the sense amplifiers 514, which in turn depend on the reverse bias leakage current of at least a subset of the diodes.

As used herein, "interrogation" of the diode array is the application of a signal to one or more of the diodes in order to provoke an output on the output lines of the diode array. As used herein, "encoding circuitry" is circuitry that converts the signal outputs from the diode array to a binary value in dependence upon the reverse bias leakage of the diode.

Whereas the embodiment of FIGS. 2 and 4 arrange the diodes in a square cross-bar array, that is not necessary in all embodiments. In another embodiment, the number of bit lines differs from the number of word lines. In one embodiment, there is only one bit line and each diode has a separate word line, or vice-versa. In some embodiments, the diodes are placed on the chip with less regularity than a cross-bar, or even at random positions. Many other variations will be apparent. In general, regardless of the physical placement of the diodes relative to each other, the array has a set of first conductors and a set of second conductors. Each set has at least one conductor. The first conductors each connect to the anodes of a respective first plurality of the diodes, and the second conductor each connect to the cathodes of a respective second set of at least one of the diodes. Each of the diodes connect to both one of the first conductors and one of the second conductors, and preferably, none of the diodes is connected to more than one of the first conductors nor more than one of the second conductors. Preferably the combination of one of the first conductors and one of the second conductors uniquely identifies a single one of the diodes.

EDA System/Workflow Explanation

Figure 7:
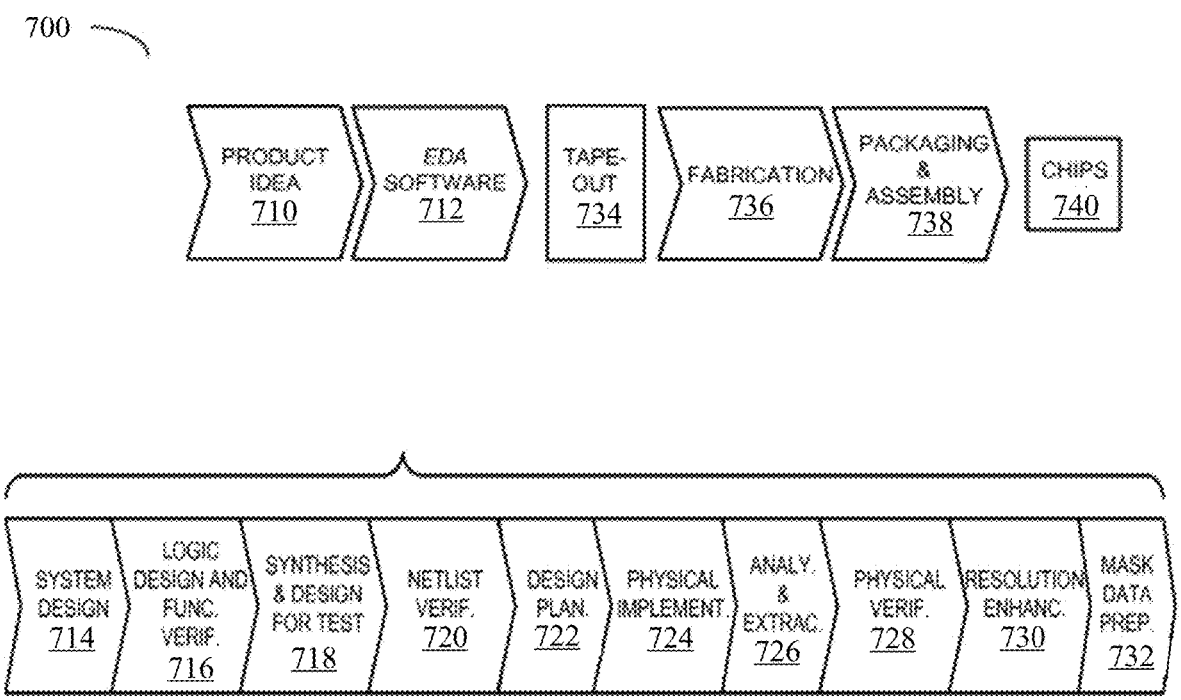
FIG. 7 depicts a flowchart of various operations in the design and fabrication of an integrated circuit in accordance with an embodiment of the present disclosure.

FIG. 7 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea 710 with information supplied by a designer, information which is transformed during a process to create an item of manufacture (referred to herein as a design or device) that uses an EDA software tool 712, which may also be signified herein as EDA software, as a design tool, or a verification tool. When the design is finalized, it can be taped-out 734, which typically is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed, which result in the finished integrated circuit 740 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 712 includes processes 714-732, which are described below. This design flow description is for illustration purposes only and is not meant to limit the present disclosure. For example, an actual integrated circuit design may require a designer to perform the design operations in a different sequence than the sequence described herein.

During system design 714, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 716, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (RTM="Registered Trademark").

During synthesis and design for test 718, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification 720, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 722, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 724, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 726, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 728, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 730, geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 732, the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software 712.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

General Computer Explanation

FIGS. 8A, 8B and 8C are simplified block diagrams of a computer system suitable for use with embodiments of the technology, as well as circuit design and circuit embodiments of the technology.

In FIG. 8A, computer system 810 typically includes at least one computer or processor 814 which communicates with a number of peripheral devices via bus subsystem 812. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 824, comprising a memory subsystem 826 and a file storage subsystem 828, user interface input devices 822, user interface output devices 820, and a network interface subsystem 816. The input and output devices allow user interaction with computer system 810.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions 124 (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 810 depicted in FIG. 8A is intended only as one example for purposes of illustrating the preferred embodiments. Many other configurations of computer system 810 are possible having more or less components than the computer system depicted in FIG. 8A.

Network interface subsystem 816 provides an interface to outside networks, including an interface to communication network 818, and is coupled via communication network 818 to corresponding interface devices in other computer systems or machines. Communication network 818 may comprise many interconnected computer systems, machines and communication links. These communication links may be wireline links, optical links, wireless links, or any other devices for communication of information. Communication network 818 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 822 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 810 or onto communication network 818. User interface input devices typically allow a user to select objects, icons, text and the like that appear on some types of user interface output devices, for example, a display subsystem.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 810 to the user or to another machine or computer system.

Memory subsystem 826 typically includes a number of memories including a main random-access memory (RAM) 830 (or other volatile storage device) for storage of instructions and data during program execution and a read only memory (ROM) 832 in which fixed instructions are stored. File storage subsystem 828 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 828.

Bus subsystem 812 provides a device for letting the various components and subsystems of computer system 810 communicate with each other as intended. Although bus subsystem 812 is shown schematically as a single bus, alternative embodiments of the bus subsystem may use multiple busses. For example, RAM-based main memory can communicate directly with file storage systems using Direct Memory Access (DMA) systems.

FIG. 8B depicts a memory 840 such as a non-transitory, computer readable data and information storage medium associated with file storage subsystem 828, and/or with network interface subsystem 816, and can include a data structure specifying a circuit design. The memory 840 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 8C signifies an integrated circuit 890 created with the described technology that includes one or more cells selected, for example, from a cell library.

Emulation Environment Explanation

Figure 9:
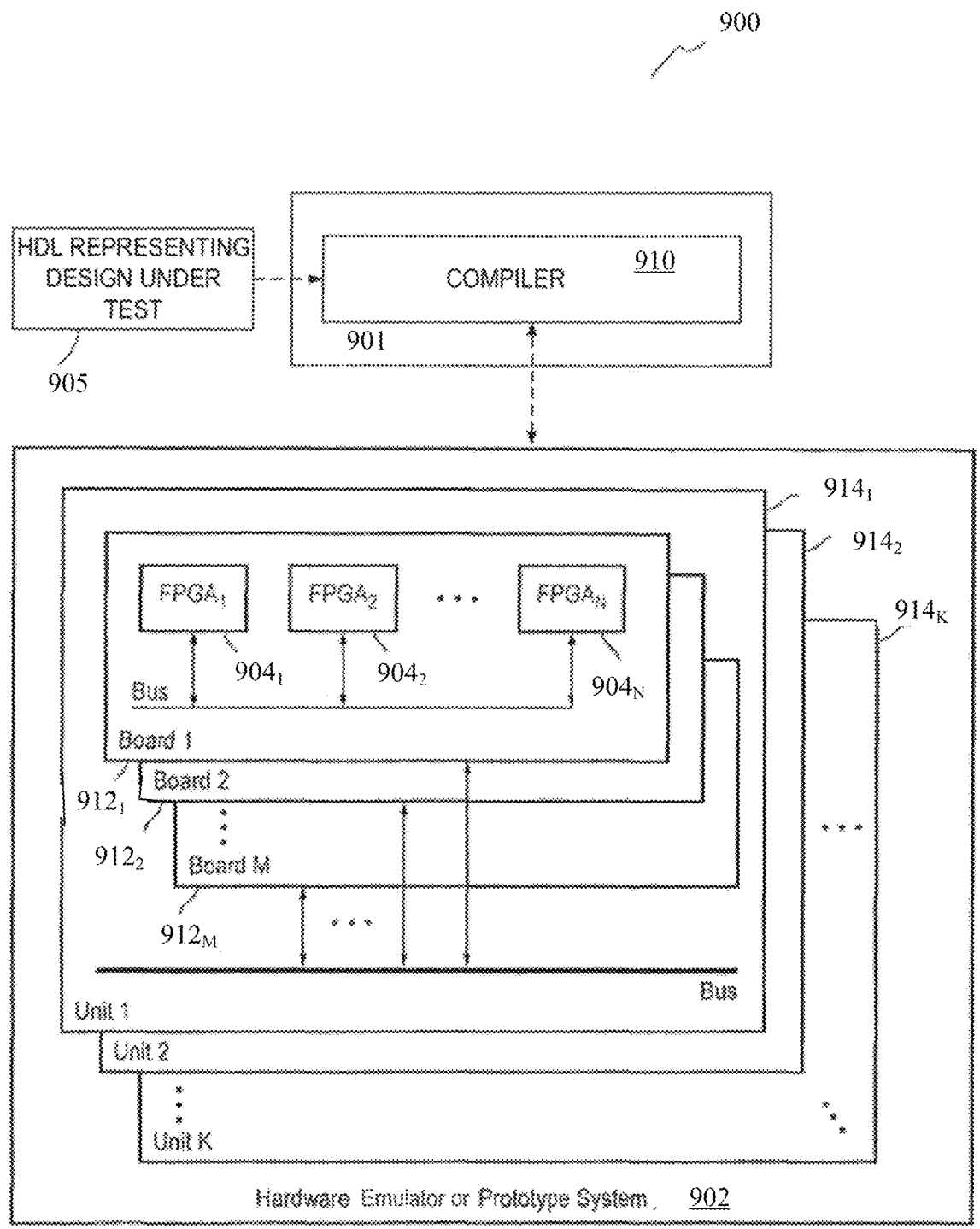
FIG. 9 depicts a block diagram of an emulation system.

An EDA software system, such as element 712 depicted in FIG. 7 typically includes an emulation system 716 to verify the functionality of the circuit design. FIG. 9 depicts a typical emulation system which includes a host computer system 901 (often part of an EDA system) and an emulator system 902 (typically a set of programmable devices such as Field Programmable Gate Arrays (FPGAs)). The host system generates data and information, typically using a compiler 910, to configure the emulator to emulate a circuit design. One of more circuit designs to be emulated are referred to as a DUT (Design Under Test). The emulator is a hardware system that emulates a DUT, for example, to use the emulation results for verifying the functionality of the DUT. One example of an emulation system that can be used for the embodiments disclosed herein is the ZeBus Server available from Synopsys, Inc.

The host system 901 comprises one or more processors. In the embodiment where the host system is comprised of multiple processors, the functions described herein as being performed by the host system may be distributed among the multiple processors.

The host system 901 typically includes a compiler 910 that processes code written in a hardware description language that represents a DUT, producing data (typically binary) and information that is used to configure the emulation system 902 to emulate the DUT. The compiler 910 may transform, change, reconfigure, add new functions to, and/or control the timing of the DUT.

The host system and emulator exchange data and information using signals carried by an emulation connection. The connection can be one or more electrical cables, for example, cables with pin configurations compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth® or IEEE 802.11. The host system and emulator can exchange data and information through a third device, such as a network server.

The emulator includes multiple FPGAs (or other programmable devices), for example, elements $904_1$ to $904_N$ in FIG. 9. Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators comprising FPGAs, other embodiments can include other types of logic blocks instead of, or along with, the FPGAs for emulating DUTs, for example, custom FPGAs, specialized ASICs for emulation or prototyping, memories, and input/output devices.

A programmable device may include an array of programmable logic blocks and a hierarchy of reconfigurable interconnects that allow the programmable logic blocks to be connected to each other according to the descriptions in the HDL code. Each of the programmable logic blocks can be configured to perform complex combinational functions, or merely simple logic gates, such as AND, and XOR logic blocks.

In many FPGAs, logic blocks also include memory elements, which may be simple latches, flip-flops or more complex blocks of memory. Depending on the length of the interconnections between different logic blocks, signals may arrive at input terminals of the logic blocks at different times.

Programmable processors $904_1$-$904_N$ may be placed into one or more hardware boards $912_1$ through $912_M$. Many of such boards may be placed into a hardware unit, e.g. $914_1$. The boards within a unit may be connected using the backplane of the unit or any other types of connections. In addition, multiple hardware units (e.g., $914_1$ through $914_K$) may be connected to each other by cables or any other means to form a multi-unit system. In general, the hardware emulation or prototype system 902 may be formed using a single board, a single unit with multiple boards, or with multiple units without departing from the teachings of the present disclosure.

For a DUT that is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system 901 receives (e.g., from a user) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic is only included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system can stores the emulation results, or transmit them to another processing system.

After emulation of the DUT, a user may request to debug a component of the DUT. If such a request is made the user may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by logic of the identified FPGAs during the re-emulation of the component. The host system stores the signals received from the emulator. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X. If the user requests to view a waveform of a signal traced during the re-emulation, the host system can retrieve the stored signal and display a plot of the signal (generates a waveform of the signal). Afterwards the user can, for example, request to re-emulate the same component but for a different time period or to re-emulate another component.

A host system typically comprises at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 910 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator so that the tracing logic traces hardware states at the proper intervals.

To debug the component, the emulator only has to run the FPGAs to which the component has been mapped. Additionally, the re-emulation of the component does not have to start from the beginning, but can start at any point desired by the user.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation. Hence, a user can identify any element (e.g., component or signal) of the DUT to debug/reemulate.

The waveform module generates waveforms based on traced signals. If a user requests to view a waveform of a signal traced during an emulation run, the host system retrieves the signal from the storage module. The waveform module displays a plot of the signal to the user. For one or more signals, when the signals are received from the emulator, the waveform module can automatically generate the plots of the signals.

Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

Semantic Support

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

Conclusion

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A physically unclonable function (PUF) device comprising:
    a substrate having a crystalline top surface;
    a stack of at crystalline layers on the substrate crystalline top surface, the stack of crystalline layers having an uppermost crystalline layer and a lowest crystalline layer, the stack of crystalline layers including a plurality of threading dislocations extending from the substrate top surface up through the stack to a top surface of the stack of crystalline layers;
    a plurality of diodes, each occupying a respective distinct lateral region on the top surface of the stack, each of the diodes having upper diode pole material formed on the top surface of the stack and forming a diode junction at the top surface of the stack with a diode pole region in the stack below the upper diode pole material; and
    interrogation/decoding circuitry connected to the diodes and arranged to provide binary output values indicating, for each of the diodes, whether the diode includes a threading dislocation,
    wherein the uppermost crystalline layer of the stack is a first piezoelectric material formed on a second layer of the stack, the second layer of the stack being a second piezoelectric material having a different bandgap than the first piezoelectric material so as to form a heterojunction at an interface between the uppermost and second layers of the stack.

2. A method for developing a physically unclonable function (PUF) for an integrated circuit device, comprising:
    epitaxially growing a stack of crystalline layers on a substrate having a crystalline top surface, the stack of crystalline layers having an uppermost crystalline layer and having a lowest crystalline layer which has a lattice constant that differs from that of the crystalline top surface of the substrate, the stack of crystalline layers including a plurality of threading dislocations extending from the substrate top surface through the stack to a top surface of the stack of crystalline layers;
    forming a plurality of diodes, each occupying a respective distinct lateral region on the top surface of the stack, by forming upper diode pole material for each of the diodes on the top surface of the stack of crystalline layers, each diode forming a diode junction at the top surface of the stack with a diode pole region in the stack and below the upper diode pole material; and
    forming interrogation/decoding circuitry connected to the diodes and arranged to provide binary output values indicating, for each of the diodes, whether the diode includes a threading dislocation, and
    wherein the uppermost crystalline layer of the stack is a first piezoelectric material formed on a second layer of the stack, the second layer of the stack being a second piezoelectric material having a different bandgap than the first piezoelectric material so as to form a heterojunction at an interface between the uppermost and second layers of the stack.

3. The method of claim 2, wherein
    the diode pole regions of the diodes formed in the forming of a plurality of diodes are in the uppermost crystalline layer of the stack.

4. The method of claim 2, wherein the second layer of the stack is GaN and the uppermost crystalline layer of the stack is an alloy including GaN.

5. The method of claim 2, wherein the uppermost crystalline layer of the stack is an alloy of GaN having a larger bandgap than GaN, and is formed on the second layer of the stack being GaN, so as to form the heterojunction at the interface between the uppermost and second layers of the stack,
    the method further including forming an integrated circuit having a plurality of transistors in the stack.

6. The method of claim 2, wherein the uppermost crystalline layer of the stack is an N-type semiconductor material,
    and wherein the upper pole material for at least one of the diodes is a P-type semiconductor material and the diode junction is a P-N junction.

7. The method of claim 2, wherein the uppermost crystalline layer of the stack is a P-type semiconductor material,
    and wherein the upper pole material for at least one of the diodes is an N-type semiconductor material and the diode junction is a P-N junction.

8. The method of claim 2, wherein an anode material for at least one of the diodes is a metal and the diode junction is a Schottky junction.

9. A method for developing a physically unclonable function (PUF) for an integrated circuit device, comprising:
    epitaxially growing a stack of crystalline layers on a substrate having a crystalline top surface, the stack of crystalline layers having an uppermost crystalline layer and having a lowest crystalline layer which has a lattice constant that differs from that of the crystalline top surface of the substrate, the stack of crystalline layers including a plurality of threading dislocations extending from the substrate top surface through the stack to a top surface of the stack of crystalline layers;
    forming a plurality of diodes, each occupying a respective distinct lateral region on the top surface of the stack, by forming upper diode pole material for each of the diodes on the top surface of the stack of crystalline layers, each diode forming a diode junction at the top surface of the stack with a diode pole region in the stack and below the upper diode pole material;
    forming interrogation/decoding circuitry connected to the diodes and arranged to provide binary output values indicating, for each of the diodes, whether the diode includes a threading dislocation;
    forming a first set of at least one first conductor each connected to the upper diode pole material of a respective one of a first plurality of the diodes;
    forming a second set of at least one second conductor each connected to the diode pole region of a respective one of a second set of at least one of the diodes, each of the diodes connected to both one of the first conductors and one of the second conductors; and connecting the first and second conductors to the interrogation/decoding circuitry.

10. The method of claim 9, wherein the uppermost crystalline layer of the stack is a first piezoelectric material formed on a second layer of the stack, the second layer of the stack being a second piezoelectric material having a different bandgap than the first piezoelectric material so as to form a heterojunction at an interface between the uppermost and second layers of the stack;

and wherein the second conductors include a 2DEG layer or a 2DHG layer below the heterojunction.

11. The method of claim 9, wherein none of the diodes is connected to more than one of the first conductors nor more than one of the second conductors, the combination of one of the first conductors and one of the second conductors uniquely identifying a single one of the diodes.

12. The method of claim 11, further comprising forming interrogation circuitry which applies interrogation signals on a selected one of the first conductors, and forming encoding circuitry which encodes signals output from each of the second conductors which are connected to diodes that are also connected to the selected first conductor, as a binary logic value in dependence upon reverse bias leakage current through the diodes.

13. The method of claim 11, further comprising forming challenge/response circuitry which outputs a response value in dependence upon both a provided challenge value and reverse bias leakage current of at least a subset of the diodes.

14. A physically unclonable function (PUF) device comprising:

a substrate having a crystalline top surface;

a stack of at crystalline layers on the substrate crystalline top surface, the stack of crystalline layers having an uppermost crystalline layer and a lowest crystalline layer, the stack of crystalline layers including a plurality of threading dislocations extending from the substrate top surface up through the stack to a top surface of the stack of crystalline layers;

a plurality of diodes, each occupying a respective distinct lateral region on the top surface of the stack, each of the diodes having upper diode pole material formed on the top surface of the stack and forming a diode junction at the top surface of the stack with a diode pole region in the stack below the upper diode pole material;

interrogation/decoding circuitry connected to the diodes and arranged to provide binary output values indicating, for each of the diodes, whether the diode includes a threading dislocation;

a first set of at least one first conductor each connected to the upper diode pole material of a respective one of a first plurality of the diodes; and a second set of at least one second conductor each connected to the diode pole region of a respective one of a second set of at least one of the diodes, each of the diodes connected to both one of the first conductors and one of the second conductors, wherein the first and second conductors are connected to the interrogation/decoding circuitry.

\* \* \* \* \*